United States Patent [19]
Fischer et al.

[11] 4,079,843
[45] Mar. 21, 1978

[54] ARRANGEMENT FOR STACKING SHEET METAL PACKETS TO FORM PACKET STACKS

[75] Inventors: Friedrich-Wilhelm Fischer; Ladislav Gregorec; Konrad Klein, all of Dortmund, Germany

[73] Assignee: Hoesch Werke Aktiengesellschaft, Dortmund, Germany

[21] Appl. No.: 683,300

[22] Filed: May 5, 1976

[30] Foreign Application Priority Data
May 13, 1975 Germany .............................. 2521178

[51] Int. Cl.² ............................................ B65G 57/03
[52] U.S. Cl. .................................... 214/6 F; 214/6 G
[58] Field of Search .................... 214/6 DK, 6 F, 6 G, 214/6 H, 1 S; 294/67 BB

[56] References Cited
U.S. PATENT DOCUMENTS

| | | | |
|---|---|---|---|
| 2,276,905 | 3/1942 | Windsor | 294/67 BB |
| 2,864,516 | 12/1958 | Rogers | 214/6 G X |
| 3,828,944 | 8/1974 | Turchaninov et al. | 214/6 DK X |
| 3,861,536 | 1/1975 | Braner et al. | 214/6 G |

FOREIGN PATENT DOCUMENTS

| | | | |
|---|---|---|---|
| 1,395,649 | 3/1965 | France | 214/6 DK |
| 969,527 | 9/1964 | United Kingdom | 214/6 H |

*Primary Examiner*—L. J. Paperner
*Attorney, Agent, or Firm*—Walter Becker

[57] ABSTRACT

An arrangement for stacking sheet metal packets to form packet stacks which comprises a transfer device arranged above stacking tables adapted to be lifted and lowered and equipped with sheet metal packet pliers likewise adapted to be lifted and lowered. The arrangement furthermore comprises a roller bed arranged in front of or between the stacking tables and the transfer device. The transfer device or the roller bed are movable in the longitudinal direction thereof.

4 Claims, 6 Drawing Figures

ARRANGEMENT FOR STACKING SHEET METAL PACKETS TO FORM PACKET STACKS

The present invention relates to an arrangement for stacking sheet metal packets to make up stacked packets.

Heretofore, for instance at the end of band cutting installations, great sheet metal packets were formed from individual metal sheets by stacking devices, and such sheet metal packets were lifted by travelling crane suspension means and were deposited in warehouses. In said warehouses, the large sheet metal packets are prior to being dispatched divided into small packets which were marked, weighed, bound up, and were subsequently by crane suspension means stacked one above the other in the form of stacked packets and were deposited as stacked packets in sheet metal warehouses. In some instances, already in the stacking installations, the large sheet metal packets are divided into small packets by insertion of intermediate or dividing members in order to facilitate the dividing of the large packets in the sheet metal warehouses.

Stacking installations behind lines of shears have become known according to which the small sheet metal packets formed in the stacking devices are laterally moved out and are subsequently by means of a travelling crane brought to binding tables where they are bound up and from where they are subsequently again by a travelling crane moved to the sheet metal warehouse.

Furthermore, installations have become known in which the binding operation is carried out on roller beds. Also, in this instance, the sheet metal packets are transferred from the stacking device to the roller bed by means of a travelling crane and after being bound are past said roller bed combined to stacked packets by means of a travelling crane.

These heretofore known methods and devices require considerable cranework for the transfer and the stacking of the sheet metal packets into packet stacks. In this connection, it is particularly disadvantageous that the formation of stacked packets has to be carried out in the sheet metal warehouse where it causes interference with the loading operation.

It is, therefore, an object of the present invention to provide an arrangement which will overcome the above mentioned drawbacks and in particular will make any cranework unnecessary in connection with the combining of the sheet metal packets so as to form stacks of packets.

These and other objects and advantages of the invention will appear more clearly from the following specification in connection with the accompanying drawing, in which.

The above outlined objects underlying the present invention have been realized in conformity with the present invention by a transfer device which is arranged above stacking tables adapated to be lifted and lowered and which is provided with sheet metal packet pliers adapted to be lifted and lowered, and by a roller bed arranged in front of or between the stacking tables and said transfer device, said transfer device or said roller bed being displaceable in their longitudinal direction.

Expediently, at the level of the stacking tables there is provided a transverse conveyor operable to work in a direction transverse to said roller bed. Advantageously, the stacking tables are arranged on carriages which are displaceable transverse to the longitudinal extension of said roller beds.

Figure 1:
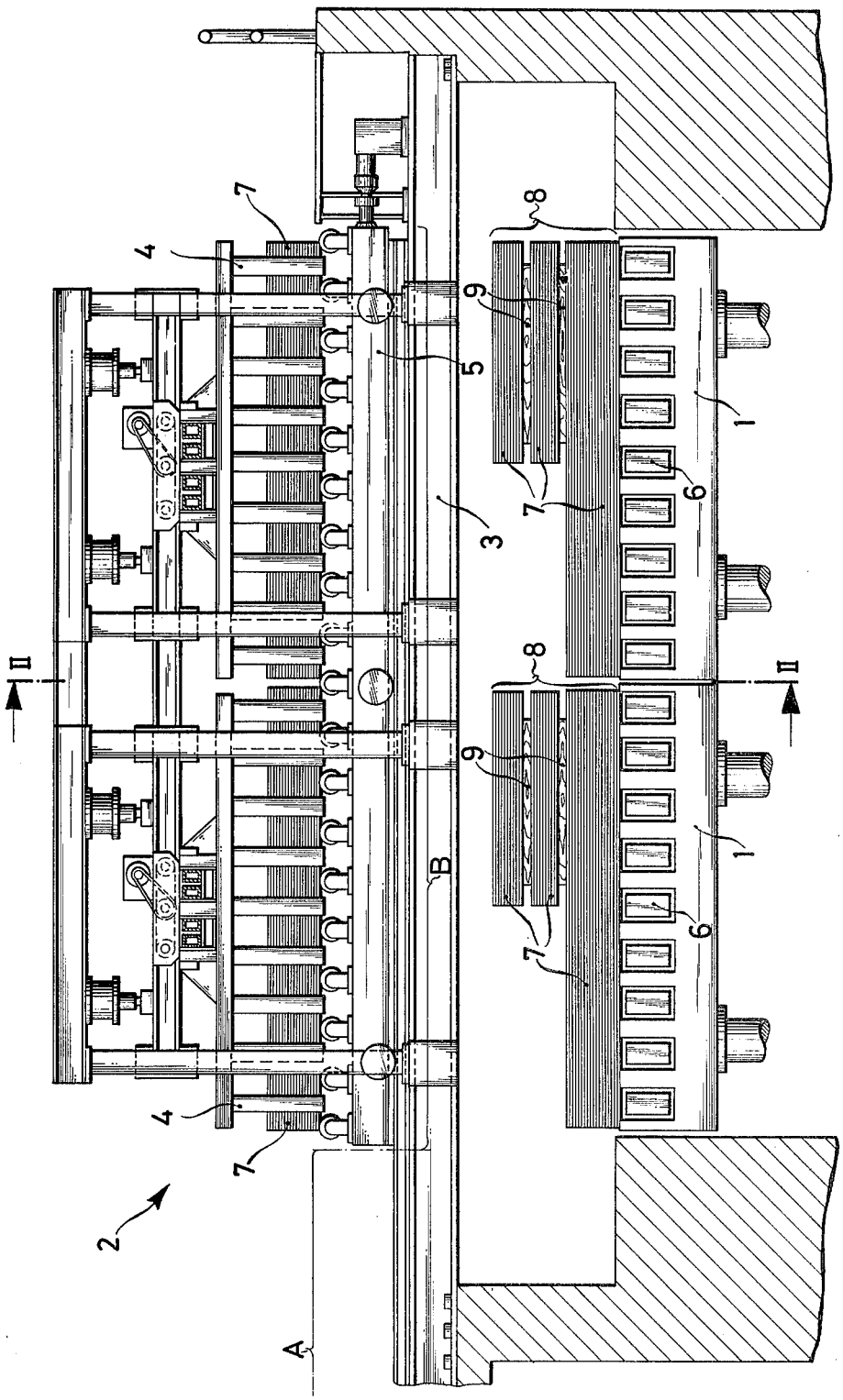
FIG. 1 shows a side view of an arrangement according to the present invention.
Figure 2:
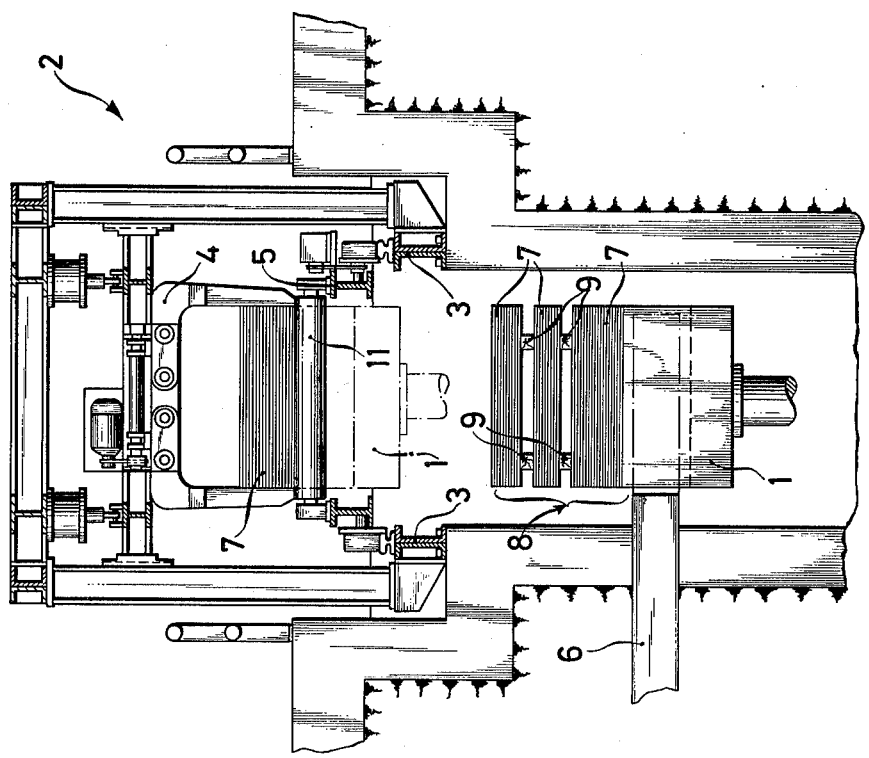
FIG. 2 is a fragmentary section taken along the line II—II of FIG. 1.
Figure 3:
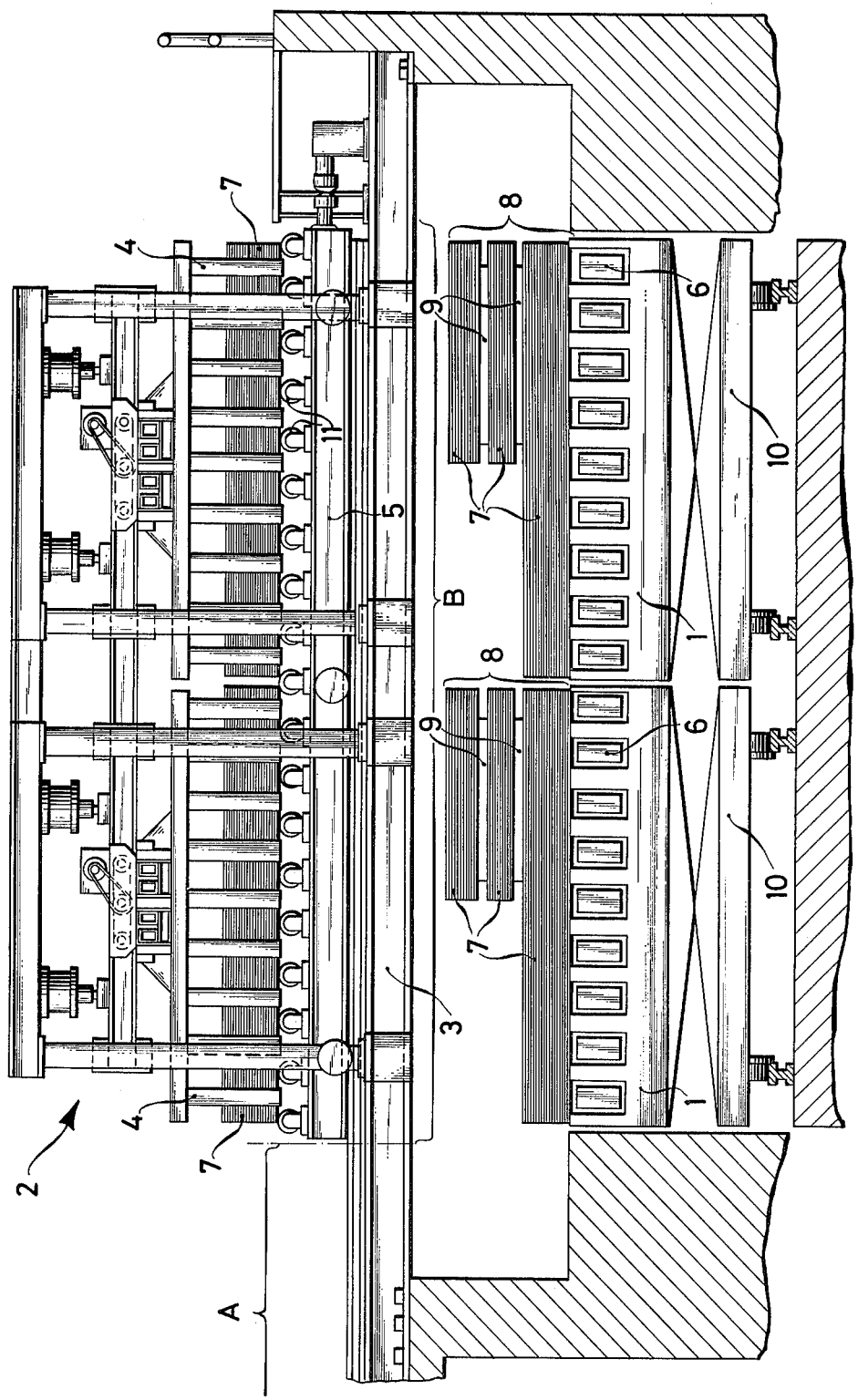
FIG. 3 is a side view of an installation modified over that of FIGS. 1 and 2.

Referring now to the drawings in detail, it will be seen from FIGS. 1 to 3 that the arrangement illustrated therein comprises a transfer device 2 arranged above stacking tables 1 which are adapted to be lifted and lowered. The transfer device 2 is supported by a frame 3 which is equipped with sheet metal packet pliers 4 adapted to be lifted and lowered and with a roller bed 5 arranged between the stacking tables 1 and the transfer device 2, said roller bed 5 being displaceable in longitudinal direction on frame 3. The arrangement of FIGS. 1 to 3 furthermore comprises a transverse conveyor 6 operable at the level of the stacking tables 1 in a direction transverse to the roller bed 5.

For purposes of stacking sheet metal packets 7 to form packet stacks 8, the roller bed 5 with the sheet metal packets 7 formed thereon for instance behind a non-illustrated line of shears is moved from the take-over station A to the stacking station B. The liftable and lowerable sheet metal packet pliers 4 of the transfer device 2 lift the sheet metal packets 7 from the roller bed 5 and after the roller bed 5 has returned to the take-over station A deposit them onto the liftable and lowerable stacking tables 1 in the lifted position. This operation is repeated several times until the desired packet stack 8 has been formed while the stacking tables 1 are each time lowered by the height of the next following sheet metal packet 7 plus the height of the spacer members 9 interposed between the individual sheet metal packets 7. The stacking tables 1 are then lowered completely and thus deposit the packet stacks 8 onto the transverse conveyor 6 which operates in a direction transverse to the roller bed 5. The transverse conveyor 6 conveys the packet stacks 8 for instance to a non-illustrated sheet metal warehouse.

As has been illustrated in FIG. 3, the stacking tables 1 are arranged on carriages 10 which are displaceable in a direction transverse to the longitudinal direction of the roller bed whereby the packet stacks 8 can be deposited on the transverse conveyor 6 at any desired points.

Figure 5:
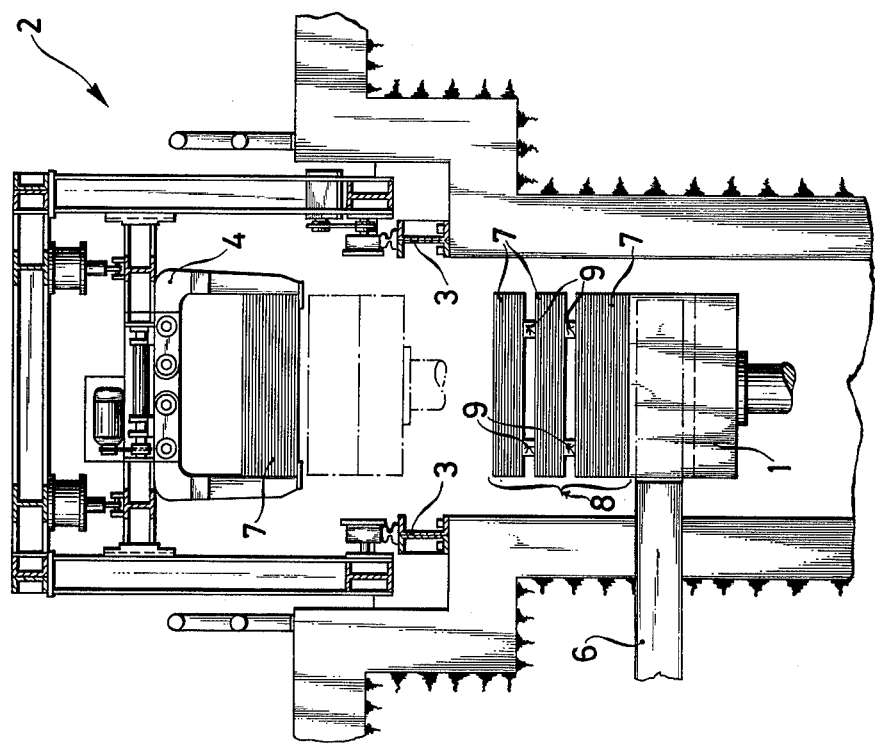
FIG. 5 is a fragmentary section taken along the line V—V of FIG. 4.
Figure 4:
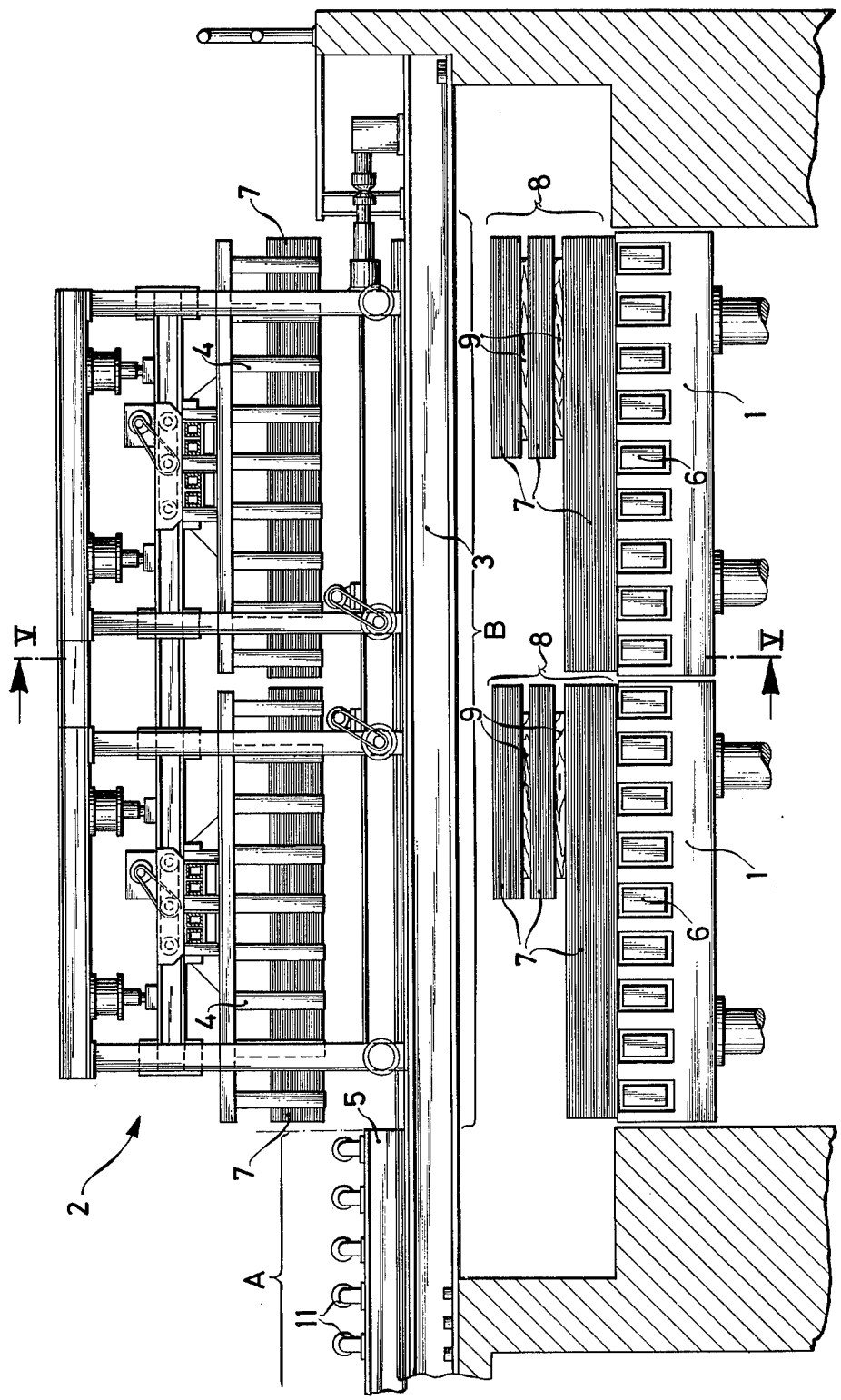
FIG. 4 shows a side view of a further modification of an installation according to the invention.
Figure 6:
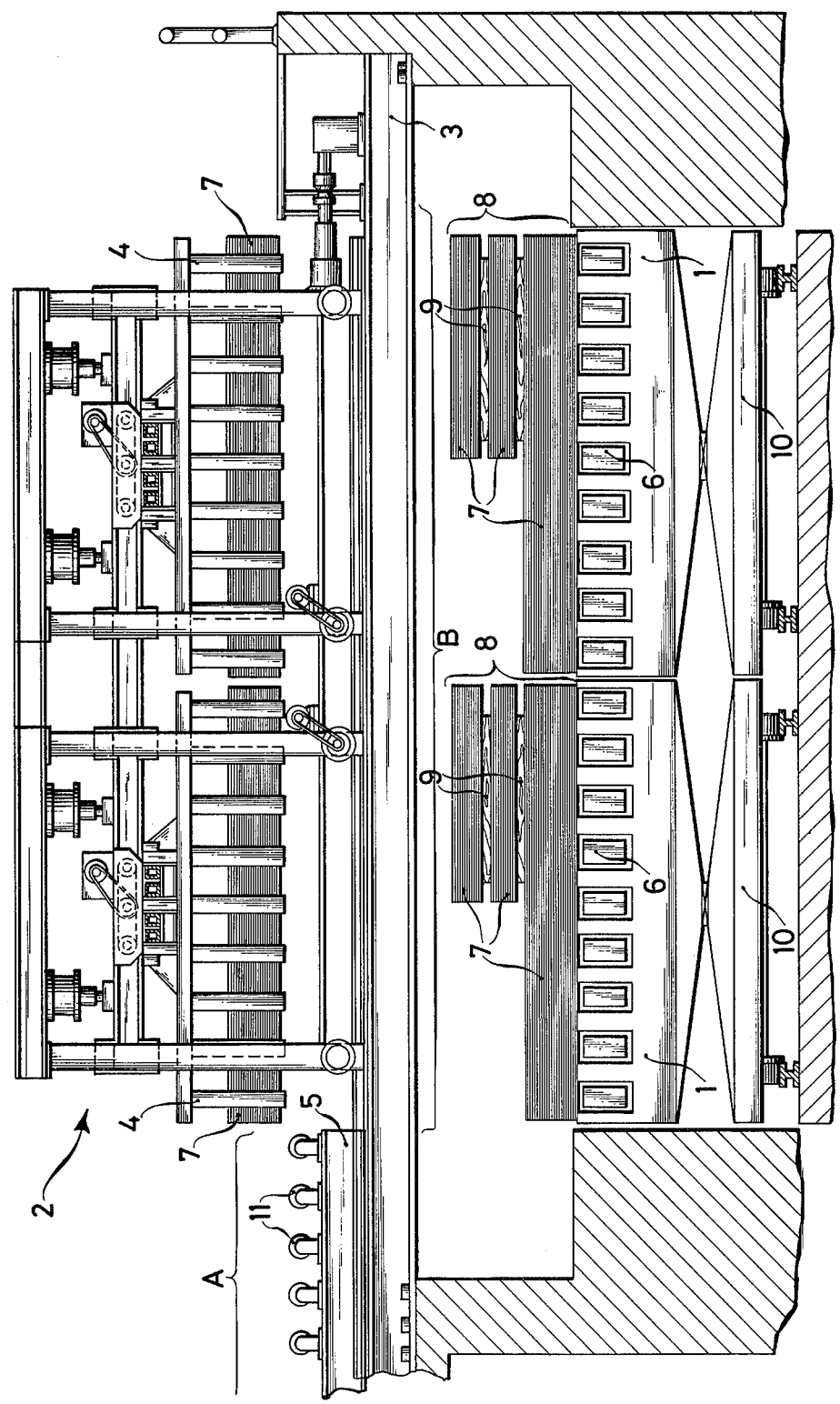
FIG. 6 shows a side view of a modification of the arrangement of FIGS. 4 and 5.

FIGS. 4 to 6 illustrate further embodiments of the arrangement according to the invention. According to FIGS. 4 to 6, the roller bed 11 is stationarily arranged ahead of the liftable and lowerable stacking tables 1, and the transfer device 2 is displaceable on frame 3 in the longitudinal direction above the roller bed 11.

For purposes of stacking sheet metal packets 7 to form packet stacks 8, the transfer device 2 moves above the roller bed 11 to the take-over station A by means of the liftable and lowerable sheet metal packet pliers 4, picks up the sheet metal packets 7 from roller bed 11, and moves back to the stacking station B, where the sheet metal packets 7, similar to the embodiment of FIGS. 1 to 3 are deposited upon the stacking tables 1, stacked to form packet stacks 8, and are transferred to the transverse conveyor 6 which transports the packet stacks 8 to a sheet metal warehouse not illustrated. Also with this embodiment, the stacking tables 1 may be arranged on carriages 10 as shown in FIG. 6.

As will be evident from the above, the arrangement according to the present invention has the great advantage that any cranework for combining the sheet metal packets to form packet stacks has become superfluous and that the loading operations in the sheet metal warehouse are not interfered with.

It is, of course, to be understood that the present invention is, by no means, limited to the specific showing in the drawings, but also comprises any modifications within the scope of the appended claims.

What we claim is:

1. An apparatus for transporting packets from a take-over station and stacking them at a stacking station for conveyance to a warehouse, comprising roller bed means for receiving a longitudinal row of sheet metal packets the length of said bed means at the take-over station, stacking tables at the stacking station arranged in a row corresponding to the row of packets on said roller bed means and having means to raise and lower said tables, transfer means having sheet metal pliers arranged in a row corresponding to the row of packets on said roller bed means and having means for raising and lowering said pliers to lift said row of said packets from said roller bed means and to lower said row of said packets to form stacks on said stacking tables, one of said roller bed means and said transfer means being longitudinally movable for movement of said packets from said take-over station to said stacking station, and conveyor means movable transversely of said roller bed means to convey said stacks of packets from said stacking tables when lowered.

2. An apparatus as claimed in claim 1, in which said roller bed means is longitudinally movable from said take-over station to said stacking station to transport said packets, and said transfer means is positioned above said stacking tables and said roller bed means when at said stacking station.

3. An apparatus as claimed in claim 1, in which said transfer means is movable between said take-over station and said stacking station to transport said packets to said stacking station.

4. An apparatus as claimed in claim 1, in which said conveyor means includes carriage means supporting said stacking tables and displaceable in a direction transverse to the longitudinal direction of said roller bed means.

* * * * *